(12) United States Patent
Horiuchi et al.

(10) Patent No.: US 6,714,730 B2
(45) Date of Patent: Mar. 30, 2004

(54) LENS BARREL AND PHOTOGRAPHING APPARATUS THEREWITH

(75) Inventors: Hiroyuki Horiuchi, Hachioji (JP); Naoyuki Inoue, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/395,374

(22) Filed: Mar. 24, 2003

(65) Prior Publication Data

US 2003/0180036 A1 Sep. 25, 2003

(30) Foreign Application Priority Data

Mar. 25, 2002 (JP) .......................... 2002-083846

(51) Int. Cl.⁷ .............................. G03B 5/00; G02B 7/02; G02B 15/14
(52) U.S. Cl. .......................... 396/72; 396/349; 359/704; 359/823; 359/829
(58) Field of Search .......................... 396/72–88, 349; 359/694, 704, 823, 829

(56) References Cited

U.S. PATENT DOCUMENTS

| 5,701,206 | A | * | 12/1997 | Sasaki et al. ............... 359/704 |
| 6,115,189 | A | * | 9/2000 | Nomura et al. ............. 359/694 |
| 6,480,677 | B1 | * | 11/2002 | Uno ........................... 396/83 |

* cited by examiner

*Primary Examiner*—W. B. Perkey
(74) *Attorney, Agent, or Firm*—Cohen, Pontani, Lieberman & Pavane

(57) ABSTRACT

A lens barrel includes an outer cylinder having a guide section and an inner cylinder for holding a lens and having a guided section, which is engaged with the guide section and moved in an optical axis direction in response to a rotation of the outer cylinder. The guide section has a guiding portion for introducing the inner cylinder into an operating and storing positions, and the guiding portion has a first guiding part, a second guiding part formed continuously to the first guiding part, having a lead angle different from that of the first guiding part, and a third guiding part formed continuously to the second guiding part, having a lead angle smaller than that of the second guiding part. The inner cylinder is positioned, at the storing position, within an area in which the guided section is engaged with the third guiding part.

16 Claims, 7 Drawing Sheets

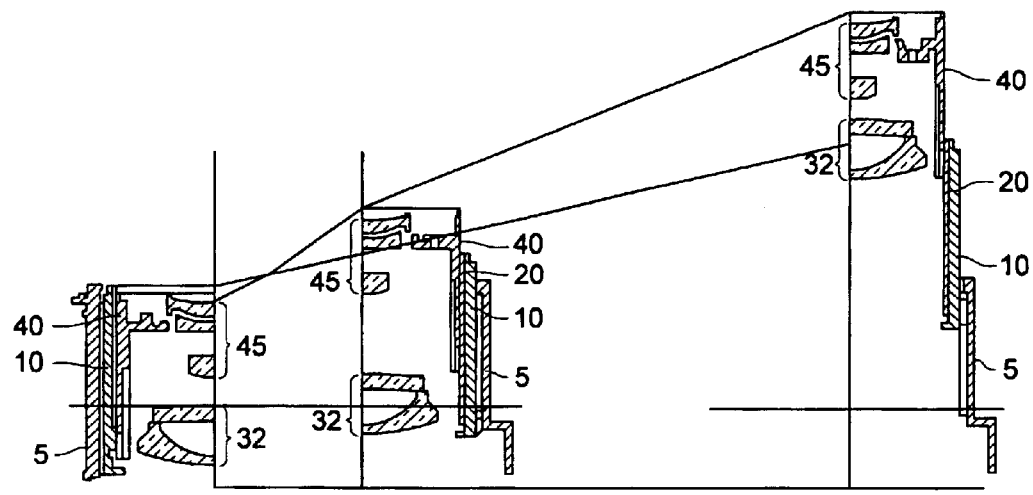
FIG. 7(a)  FIG. 7(b)  FIG. 7(c)
FIG. 8
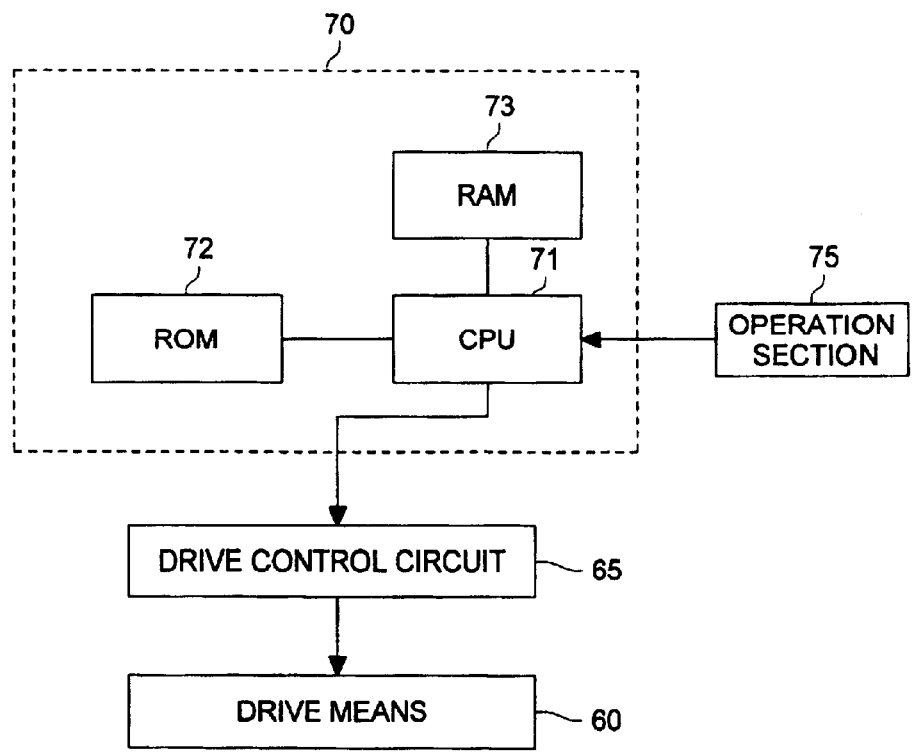

LENS BARREL AND PHOTOGRAPHING APPARATUS THEREWITH

BACKGROUND OF THE INVENTION

The present invention relates to a lens barrel holding a lens or a lens group, and a photographing apparatus provided with the lens barrel.

In a camera which is provided with the lens barrel and used for photographing, (hereinafter, described as a photographing apparatus), there is a camera of a type in which the lens barrel holding the lens or lens group is structured so that it can conduct the telescopic motion in the optical axis direction by a plurality of barrel bodies, and the lens held inside the lens barrel is moved and the focusing (hereinafter, described as focusing) or the magnification change is conducted, or after it is used, the lens barrel is retracted and stored in the main body of the photographing apparatus. Such a lens barrel is structured in such a manner that, in an inner periphery or outer periphery of a plurality of barrel bodies constituting the lens barrel, for example, such as the lens barrel holding the lens group, a helicoid mechanism or cam mechanism is provided, and when at least one hand of those barrel bodies is rotated, the barrel bodies are moved each other in the optical axis direction.

Further, in such a lens barrel, there is used the cam or helicoid mechanism to conduct the focusing and magnification change, and the cam and helicoid mechanism to protrude and retract the lens barrel from the stored position (collapsing position) to the operating position, are continuously formed, and the lens barrel structured so that the protruding and retracting operation and the focusing and magnification change operation of the lens barrel can be smoothly conducted by the same drive mechanism.

Then, in such a helicoid or dam, it is conducted that, when a lead angle of a portion at which the protruding and retracting operation is conducted, that is, when a guide angle in the optical direction to the peripheral direction of the lens barrel is largely set, the movement distance to the rotation of the barrel body is made large, and the lens barrel is effectively retracted.

Further, in the photographing apparatus, there is an apparatus provided with an automatic opening and closing type barrier in the forefront portion of the lens barrel, and at the operation time, the barrier is opened and the lens is exposed, and at the time of storing, the barrier is closed and the lens is protected. In this barrier opening and closing mechanism, there is a mechanism structured so that it is operated by being interlocked with the protruding and retracting operation of the lens barrel, and so that, when the retraction of the lens barrel to the storing position is completed, the drive mechanism of the lens barrier is operated, and the barrier is closed.

However, in the photographing apparatus provided with such a lens barrel, in the case where the lens is retracted, when the drive mechanism of the lens barrel is stopped, there is a problem that, by an error of the rotation stop position of the barrel body, the position in the optical axis direction is dislocated, when the retraction of the lens barrel is completed. When there is a dislocation of the position when the lens barrel is retracted, the appearance of the photographing apparatus is injured.

Further, when the barrier operated being interlocked with the protruding and retracting operation of the lens barrel is provided, by the dislocation of the position of the lens barrel when the retraction of the lens barrel is completed, there is also a possibility that the operation error is generated, like that the closing of the barrier becomes imperfect.

SUMMARY OF THE INVENTION

The object of the present invention is to provide a lens barrel and a photographing apparatus equipped therewith by which the dislocation of the stop position when the retraction of the lens barrel is completed, can be reduced.

The above-described object can be attained by any one of Structures (1) to (3).

(1) In the lens barrel, it has the following structure: an outer barrel on an inner peripheral surface of which, a guide section is formed; and an inner barrel which holds a lens and on an outer peripheral surface of which, a guided section engaged with the guide section is formed, and which is moved in the optical axis direction by the rotation of the outer barrel, wherein the guide section has a guiding portion for introducing the inner barrel into a plurality of positions including the operating position and the storing position; and the guiding portion has the first guiding part, and the second guiding part formed so that it is continued to the first guiding part, and has the different lead angle from the first guiding part, and the third guiding part which is continued to the second guiding part and is formed so that it has a lead angle which is smaller than the second guiding part, and has almost the same lead angle as the first guiding part; and at the storing position, the inner barrel is positioned within the area in which the guided section can be engaged with the third guiding part.

(2) In the lens barrel, it has the following structure: an outer barrel on an inner peripheral surface of which, a guide section is formed; and an inner barrel which holds a lens and on an outer peripheral surface of which, a guided section engaged with the guide section is formed, and which is moved in the optical axis direction by the rotation of the outer barrel, wherein the inner barrel can move from the storing position to the operating position; and the guide section has a guiding portion to introduce the inner barrel from the operating position into the storing position; the guiding portion is structured including the first guiding part positioned on the operating position side and the second guiding part formed continuously to the first guiding part; the lead angle of the second guiding part is formed to be larger than 0°, and smaller than the lead angle of the first guiding part; and in the storing position, the inner barrel is positioned within an area in which the guided section can be engaged with the second guiding part.

(3) In the photographing apparatus, it has a lens barrel including the following structure: an outer barrel on an inner peripheral surface of which, a guide section is formed; and an inner barrel which holds a lens and on an outer peripheral surface of which, a guided section engaged with the guide section is formed, and which is moved in the optical axis direction by the rotation of the outer barrel; the guide section has a guiding portion for introducing the inner barrel into a plurality of positions including the operating position and the storing position; and the guiding portion has the first guiding part, and the second guiding part formed so that it is continued to the first guiding part, and has the different lead angle from the first guiding part, and the third guiding part which is continued to the second guiding part and is formed so that it has a lead angle which is smaller than the second guiding part, and has almost the same lead angle as the first guiding part, wherein at the storing position, the inner barrel is positioned within the area in which the guided section can be engaged with the third guiding part; it has a drive means for driving the female helicoid cylinder, and a control means for controlling the drive means; and the control means controls the drive means to move male helicoid cylinder from the storing position to the operating position.

Furthermore, the more preferable Structures (4) to (11) are as follows.

(4) A lens barrel which has: an outer barrel on an inner peripheral surface of which, a guide section is formed; and an inner barrel which holds a lens and on an outer peripheral surface of which, a guided section engaged with the guide section is formed, and which is moved in the optical axis direction by the rotation of the outer barrel; and the lens barrel in which the inner barrel is moved from the storing position to the operating position, the lens barrel is characterized in that: the guide section has a guiding portion for introducing the inner barrel from the operating position into the storing position direction; and the guiding portion is structured including the first guiding part positioned on the operating position side, and the second guiding part formed so that it is continued to the first guiding part; and the lead angle of the second guiding part is formed to be smaller than the lead angle of the first guiding part; and at the storing position, the inner barrel is positioned within the area in which the guided section can be engaged with the second guiding part.

Herein, the guide section and the guided section implies a cam structure by the cam and the protrusion such as a cam pin, or a helicoid structure. Further, the lead angle implies an angle formed in the optical axis direction, to the peripheral direction almost perpendicular to the optical axis direction of the lens barrel. Further, the "operating position" is a position of the inner barrel to the outer barrel in the lens barrel which is in the state that the photographing can be conducted. In this operating position, the inner barrel is further moved to the outer barrel, and the focusing or the magnification change may also be conducted, and an area at which the inner barrel can be positioned in the state that the photographing can be conducted is included in the operating position.

Further, the "storing position" is a position of the inner barrel to the outer barrel when the retraction of the inner barrel is completed at a time when the inner barrel is retracted into the outer barrel and is made compact at the no-use time of the lens barrel. Hereupon, a predetermined position of the inner barrel to the outer barrel which is previously set as the optimum position at which the inner barrel is stopped at the time of the retraction is defined as a "predetermined optimum storing position". That is, the "actual storing position" is a position at which actually the inner barrel stops, to the "predetermined optimum storing position". In addition, the lens barrel when the inner barrel is at the operating position is defined as a "using state" and the lens barrel when the inner barrel is retracted into the storing position is defined as a "storing state".

According to Structure (4), in the outer barrel and inner barrel constituting the lens barrel, the guide section of the outer barrel has the first and second guiding parts, and the lead angle of the second guiding part is formed to be not larger than the lead angle of the first guiding part. Further, in the storing position, the inner barrel is positioned within an area in which the guided section is engaged with the second guiding part. That is, when the inner barrel is moved from the operating position to the storing position to the outer barrel, the guided section is introduced according to the guide section of the outer barrel, and the inner barrel moves a necessary distance along the first guiding part quickly, and in near the storing position, is engaged with the second guiding part, and gradually moved and arrived at the storing position. Accordingly, at the time when the retraction is completed, because the dislocation between the predetermined optimum storing position and the actual storing position of the inner barrel is reduced, the appearance of the lens when the retraction of the inner barrel is completed, becomes good. Further, for example, when the barrier which is moved being interlocked with the protruding and retracting operation of the inner barrel is provided in the lens barrel, because it can be prevented that the operation error is generated, like as that the storing position of the inner barrel is dislocated from the predetermined optimum storing position and the closing of the barrier is imperfect, it is preferable.

(5) A lens barrel which has: a female helicoid cylinder on whose inner peripheral surface, the female helicoid is formed; and a male helicoid cylinder which holds the lens, and on whose outer peripheral surface, the male helicoid which is engaged with the female helicoid is formed, and which moves in the optical axis direction by the rotation of the female helicoid cylinder, the lens barrel is characterized in that: the female helicoid is made as a compound female helicoid structured by the first female helicoid portion, and the second female helicoid portion which is formed so that it is continued to the first female helicoid portion and which has the lead angle different from the first female helicoid portion, and the third female helicoid portion which is formed so that it is continued to the second female helicoid portion and which has the lead angle not larger than the second female helicoid portion; and the male helicoid in the male helicoid cylinder is made as a compound male helicoid provided with: the first male helicoid portion engaged with the first female helicoid portion; the second male helicoid portion engaged with the second female helicoid portion; and the third male helicoid portion engaged with the third female helicoid portion; and the third female helicoid portion moves the male helicoid cylinder in the optical axis direction for the protruding or retracting operation.

According to Structure (5), when the third female helicoid portion whose lead angle is smaller than the second female helicoid portion is formed, at the time of protruding and retracting operation, the male helicoid cylinder is gradually moved to the female helicoid cylinder and arrives at the storing position. Accordingly, because the dislocation between the actual storing position and the storing target position of the male helicoid cylinder to the female helicoid cylinder is reduced, the appearance at the storing time of the lens barrel becomes good. Further, for example, when the barrier which is moved being interlocked with the protruding and retracting operation of the male helicoid cylinder is provided, because it can also be prevented that the operation error of the barrier is generated by the dislocation between the actual storing position and storing target position, it is preferable.

(6) A lens barrel described in Structure (5) is characterized in that: the first female helicoid portion moves the male helicoid cylinder in the optical axis direction for the focusing operation.

According to Structure (6), it is of course that the effect of the invention described in Structure (2) is attained, and the first female helicoid portion is set to an adequate lead angle for the focusing, and the second and third female helicoid portions are adequately set to an adequate lead angle for the operation except for the focusing, that is, for the protruding and retracting operation, and can be used.

Accordingly, the focusing operation, and the protruding and retracting operation can be respectively preferably conducted.

(7) A lens barrel described in Structure (5) or (6), which is characterized in that: the second female helicoid portion moves the male helicoid cylinder in the optical axis direction for the protruding and retracting operation which is faster than the third female helicoid portion.

According to Structure (7), because the lead angle of the second helicoid portion is set large, the movement distance of the male helicoid cylinder at the time of the protruding and retracting operation can be made large. Accordingly, the reduction of the thickness of the apparatus provide with the lens barrel, for example, the reduction of the thickness of the apparatus such as the photographing apparatus can be intended. Further, at the time of the protruding and retracting operation, because the male helicoid cylinder can be moved faster than the third female helicoid portion, and the switching between the storing state and the using state of the lens barrel can be conducted quickly, it is preferable.

(8) A lens barrel described in any one of Structures (5) to (7), which is characterized in that: the first female helicoid portion and the third female helicoid portion are formed into the almost same lead angle.

According to Structure (8), when the first female helicoid portion and the third female helicoid portion are formed into the almost same lead angle, in the male helicoid, the first male helicoid portion and the second male helicoid portion are formed, and in the first male helicoid portion, they can be made to engage with both of the first and the third female helicoid portions. Accordingly, because the shape of the male helicoid can be made simple, and the contact surface when it is engaged with the female helicoid can be made large, the male helicoid cylinder and the female helicoid cylinder can be preferably engaged without play. Further, when the contact surface of the male helicoid with the female helicoid is increased, because it can be prevented that the external light leaks into the lens barrel from between the male helicoid cylinder and the female helicoid cylinder, it is preferable.

(9) A lens barrel described in any one of Structures (5) to (8), which is characterized in that: the engagement length in the peripheral direction of the first male helicoid portion with the first female helicoid portion is longer than the engagement length in the peripheral direction of the second male helicoid portion with the second female helicoid portion.

According to Structure (9), when the engagement length of the peripheral direction of the first male helicoid portion with the first female helicoid portion is made long, the contact area of the male helicoid cylinder with the female helicoid cylinder can be large, and they can be preferably engaged without play. Accordingly, when the first male helicoid portion is used for the focusing operation, the focusing operation can be more precisely conducted. Further, when the first and third helicoids are formed into the same lead angle, because the strength of the engagement of the male helicoid cylinder with the female helicoid cylinder in the storing state, is increased, and at the time of the storing, the male helicoid cylinder can be more accurately retracted to the storing target position, it is preferable.

(10) A lens barrel described in any one of Structures (5) to (9), which is characterized in that: the adjoining compound male helicoids of at least one portion of the compound male helicoid provided on the outer periphery of the male helicoid cylinder are provided such that at least one portion viewed from the optical axis direction is mutually overlapped.

According to Structure (10), in the engagement of the female helicoid with the male helicoid, because, in an at least one portion of the peripheral direction, the female helicoid is nipped by two adjoining compound male helicoids, the male helicoid cylinder can be preferably assembled with the female helicoid cylinder without play. Further, when a portion of the adjoining compound male helicoids is overlapped with each other when viewed from the optical axis direction, because it can be prevented that the external light leaks into the lens barrel from between the male helicoid cylinder and female helicoid cylinder, it is preferable.

(11) A photographing apparatus which is provided with: a lens barrel which has a female helicoid cylinder on whose inner peripheral surface the female helicoid and the cam are formed; and a male helicoid cylinder which holds the lens and on whose outer peripheral surface the male helicoid which is engaged with the female helicoid is formed, and which is moved by the rotation of the female helicoid cylinder in the optical axis direction; a drive means for driving the female helicoid cylinder; and a control means for controlling the drive means, the photographic apparatus is characterized in that: the drive means is controlled by the control means, and the male helicoid cylinder is moved from the storing position to the operating position, and as the lens barrel, the female helicoid is made a compound female helicoid formed of the first female helicoid portion, and the second female helicoid portion formed so that it is continued to the first female helicoid portion and it has the different lead angle from the first female helicoid portion, and the third female helicoid portion formed so that it is continued to the second female helicoid portion and it has the smaller lead angle than the second female helicoid portion; and the male helicoid in the male helicoid cylinder is made a compound male helicoid provided with the first male helicoid portion which is engaged with the first female helicoid portion and the third female helicoid portion, and the second male helicoid portion which is engaged with the second female helicoid portion, and at the storing position, the first male helicoid portion is positioned at an area which is engaged with the third female helicoid portion.

According to Structure (11), the male helicoid cylinder is structured in such a manner that, at the storing position, the first male helicoid portion is positioned at an area which is engaged with the third female helicoid portion formed into the smaller lead angle than the lead angle of the second female helicoid portion. Accordingly, also in the photographing apparatus which has the drive means and the control means, and automatically moves the male helicoid cylinder from the operating position to the storing position, the dislocation between the actual storing position and the predetermined optimum storing position of the male helicoid cylinder to the female helicoid cylinder is reduced. As the result, the appearance of the lens barrel in the storing state becomes good. Further, for example, even when a barrier which is operated being interlocked with the protruding and retracting operation of the lens barrel is provided, because the generation of the operation error of the barrier can be prevented, it is preferable.

BRIEF DESCRIPTION OF THE DRAWINGS

FIG. 4(a) shows a condition of the engagement of the wide position, and FIG. 4(b) shows a condition that the second female helicoid portion with the male helicoid is engaged, FIG. 4(c) shows a condition that the engagement is moved from the second female helicoid portion to the third female helicoid portion, and FIG. 4(d) shows a condition of the engagement at the storing completion position.

FIG. 5(b) shows a condition that it is opened.

FIGS. 7(a) to 7(c) are outline cross sectional view, in FIG. 7(a), in a storing state, in FIG. 7(b), a wide position, and FIG. 7(c), a telescopic position.

FIG. 8 is a block diagram showing a structure of a control means, operation means, and drive control circuit which are provided in the photographing apparatus of the present invention.

DETAILED DESCRIPTION OF THE PREFERRED EMBODIMENT

Figure 1:
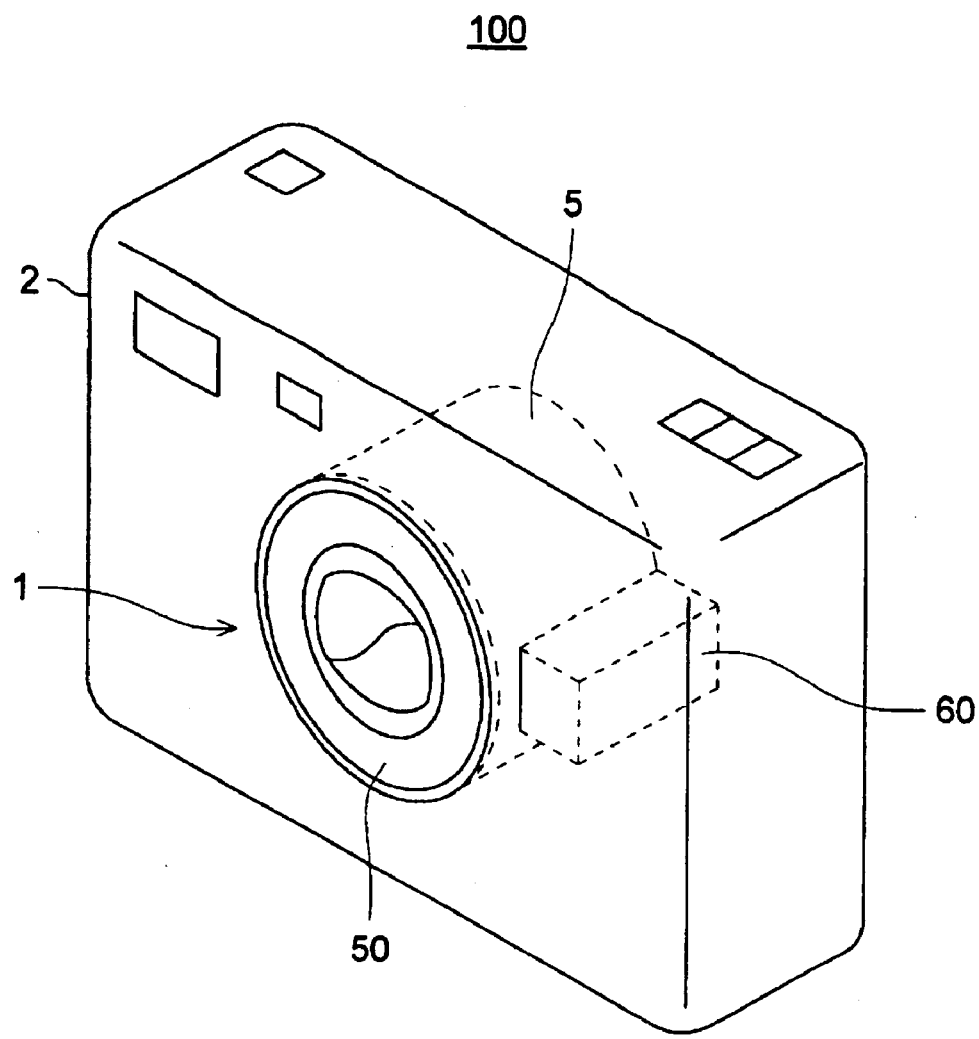
FIG. 1 is a perspective view showing an example of a photographing apparatus to which the present invention is applied.
Figure 2:
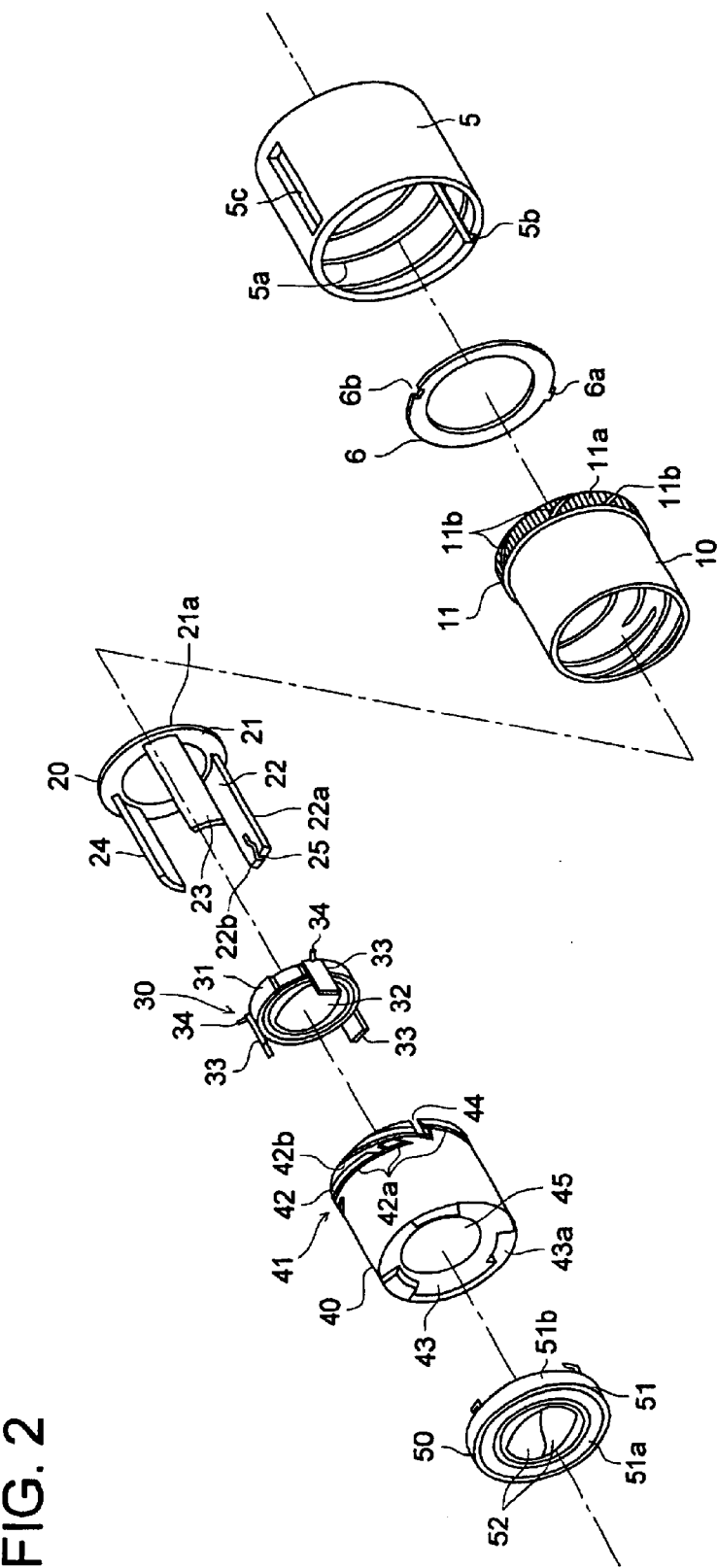
FIG. 2 is an exploded perspective view of a lens barrel to which the present invention is applied.

Referring to the drawings, embodiments of the present invention will be described below. A photographing apparatus 100 of the present invention is a camera provided with, for example, a lens barrel (for example, a camera for photograph photographing as shown in FIG. 1, or a camera for photographing a moving image). FIG. 2 is an exploded perspective view showing a lens barrel 1 as an example of the present invention. Hereupon, in FIG. 2, the left side is a subject side when the lens barrel 1 is assembled and used, and the right side is a photographing apparatus main body 2 side (or a photographer side), and the subject side is defined as a front and a photographing apparatus main body 2 side is defined as a rear. Further, FIG. 3(a) is a development view showing an inner peripheral surface 12 of a female helicoid cylinder 10, and FIG. 3(b) is a 3(b)—3(b) sectional view of FIG. 3(a).

Figure 3A:
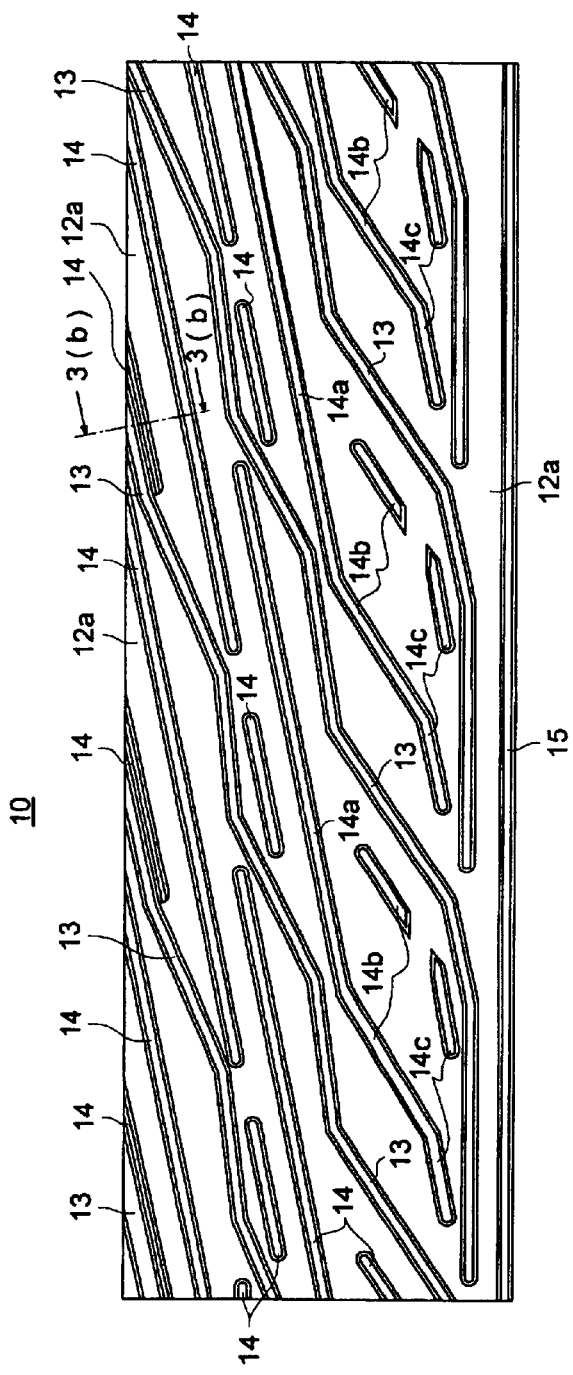
FIG. 3 is a developed view showing the inner peripheral surface of a female helicoid cylinder in FIG. 2.
FIG. 3(b) is a sectional view of a 3(b)—3(b) position in FIG. 3(a).
Figure 3B:
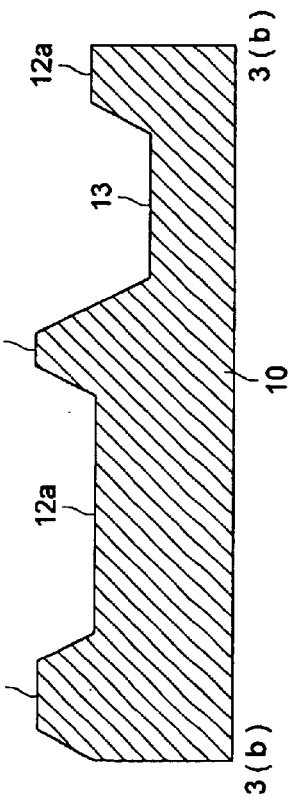

The lens barrel 1 is structured to have, as shown in FIG. 2 and FIGS. 3(a) and 3(b), a fixed cylinder 5; and a female helicoid cylinder 10 as the outer barrel on whose inner peripheral surface a cam groove 13 and a helicoid 14 are provided; a straight advance ring 20; and a rear group lens holding frame 30 which is engaged with the cam groove 13 of the female helicoid cylinder 10, and moves in the optical axis direction of the lens barrel 1; a male helicoid cylinder 40 as the inner barrel which holds the front group lens 45 and is engaged with the helicoid 14 of the female helicoid cylinder 10 and moves in the optical axis direction; and a lens barrier portion 50. Hereupon, in the present embodiment, the optical axis direction of the lens barrel cylinder 1 and the central axis direction of the fixed cylinder 5, female helicoid cylinder 10, straight advance ring 20, rear group lens holding frame 30, male helicoid cylinder 40, and lens barrier portion 50, are almost the same.

The fixed cylinder 5 is a cylinder-like member which is provided on the outmost side of the lens barrel 1, and on the inner peripheral surface, a plurality of spiral protruded strips 5a and the straight advance groove 5b in the optical axis direction are provided, and further, on the peripheral surface, a long hole 5c in the optical axis direction is formed. The fixed cylinder 5 is fixed and provided in the photographing apparatus main body 2.

The female helicoid cylinder 10 is provided inside the fixed cylinder 5. On the outer periphery of the rear side end portion of the female helicoid cylinder 10, a gear portion 11 is formed, and on this gear portion 11, a gear 11a in which a groove which is in almost parallel direction to the optical axis is provided, is formed over an all periphery. Further, in the gear portion 11, a spiral-shaped helicoid groove 11b is formed so that it crosses the gear 11a. When the female helicoid cylinder 10 is assembled inside the fixed cylinder 5, the helicoid groove 11b is engaged with the protruded stripe 5a on the inner peripheral surface of the fixed cylinder 5, and the helicoid structure is structured. Then, when the female helicoid cylinder 10 is rotated to the fixed cylinder 5, by the helicoid action of the helicoid groove 11b and the protruded stripe 5a, it is moved in the axial direction.

Further, on the inner peripheral surface 12 of the female, helicoid cylinder 10, the female helicoid 14 as the guide section, formed of the cam groove 13 and the protruded stripe which protrudes inside the female helicoid cylinder 10, is provided. In FIGS. 3(a) and 3(b), an inner peripheral surface main body which is between the cam groove 13 and the female helicoid 14 is shown by numeral 12a. The cam groove 13 moves a rear group lens holder frame 30, and as shown in FIGS. 3(a) and 3(b), in the bent shape, three came grooves are formed on the inner peripheral surface 12, and when the female helicoid cylinder 10 is rotated inside the fixed cylinder 5, the rear group lens holder frame 30 is moved from the lens storing position to the operating position at which the photographing can be conducted, and in the focusing and magnification change operation, the rear group lens 32 held in the rear group lens holding frame 30 can be moved in the adequate movement distance.

The female helicoid 14 is engaged with the male helicoid 41 provided on the outer peripheral surface of the male helicoid cylinder 40, and moves the male helicoid cylinder 40 in the optical axis direction.

The female helicoid 14 is formed as the compound female helicoid composed of the first female helicoid portion 14a whose angle (hereinafter, described as the lead angle) formed to the optical axis direction is small, to the peripheral direction perpendicular to the optical axis direction, the second female helicoid portion 14b (the first guiding part) which is formed continuously to the first female helicoid portion 14a, and whose lead angle is larger than the first female helicoid portion 14a, and the third female helicoid portion 14c (the second guiding part) which is formed continuously to the second female helicoid portion 14b, and has the almost same lead angle as the first female helicoid portion 14a.

Hereupon, these compound female helicoids are arranged, when the female helicoid cylinder 10 is mounted to the photographing apparatus 100, from the subject side (the front) to the photographer side (the rear), so that they are in the order of the first female helicoid portion 14a, the second female helicoid portion 14b, and the third female helicoid portion 14c, and further, at the position which is superimposed with the cam groove, the female helicoid 14 is interrupted to avoid the overlap with the cam groove 13.

The first female helicoid portion 14a is a portion to move the male helicoid cylinder 40 in the optical axis direction by the rotation of the female helicoid cylinder 10 for the focusing or magnification change, and the lead angle is set so that the male helicoid cylinder 40 is adequately moved in the focusing and the magnification change operations.

The second female helicoid portion 14b is a portion to protrude the male helicoid cylinder 40 and to move it to the operating position when the lens barrel 1 is operated from the storing state to the using state in the photographing apparatus 100, and when it is formed of the larger lead angle than the first female helicoid portion 14a, it is formed so that the male helicoid cylinder 40 is moved by a necessary distance to arrive at the operating position quickly to the rotation of the female helicoid cylinder 10.

The third female helicoid portion 14c is formed to be the same lead angle as the first female helicoid portion 14a. This third female helicoid portion 14c is formed continuously to the second female helicoid portion 14b, and the male helicoid cylinder 40 which moves rearward along the second female helicoid portion 14b, is further guided rearward. Then, when the lens barrel 1 becomes the storing condition, that is, the male helicoid cylinder 40 arrives at the storing position, the male helicoid cylinder 40 is positioned at an area at which male helicoid 41 is engaged with the third female helicoid portion 14c. In this manner, when the third female helicoid portion 14c whose lead angle is smaller than the second female helicoid portion 14b is formed at the storing position of the male helicoid cylinder 40, it is formed such that, at the time when the retraction operation of the lens barrel 1 is completed, even when the error is generated at the stop position in the peripheral direction of the male helicoid cylinder 40 to the female helicoid cylinder 10, the error (dislocation) of the stop position in the axial direction is reduced.

Further, at the rear side end portion of the female helicoid cylinder 10, the protruded stripe 15 which protrudes inside along the periphery, is formed.

The straight advance ring 20 is structured by a ring portion 21, and 3 guides 22, 23 and 24 extending forward in such a manner that they are along the inner peripheral surface of the male helicoid cylinder 40 from the front side of the ring portion 21. The guide 22 is formed longer than the other guides 23 and 24, and in the inside of its leading edge portion (central axis side), the cam groove 25 is formed. The cam groove 25 is a groove to drive the lens barrier portion 50, as will be described later, and the leading edge portion is opened widely, and it is formed in such a manner that it is inclined from the one hand side portion 22a to the other side portion 22b of the guide 22. The ring portion 21 is formed in such a manner that the outer diameter is smaller than the inner diameter of the female helicoid cylinder 10, and is larger than the inner diameter of the rear side end portion of the male helicoid cylinder 40. Further, on the peripheral edge portion of the rear surface 21a of the ring portion 21, a step difference is formed, and when the straight advance ring 20 is assembled inside the female helicoid cylinder 10, the rear surface 21a is exposed on the rear end portion side of the female helicoid cylinder 10 under the condition that the peripheral edge portion is in contact with the protruded stripe 15 of the end portion of the female helicoid cylinder 10.

The rear group lens holding frame 30 holds the rear group lens 32 inside the frame body 31, and on the outer peripheral portion of the frame body 31, 3 guide sections 33 which is almost parallel to the optical axis direction are provided. On the rear side end portion of these guide sections 33, bosses 34 which are respectively protruding outside almost perpendicularly to the optical axis, are provided. The rear group lens holding frame 30 is provided inside the straight advance ring 20 in such a manner that the guide sections 33 are respectively positioned among the guides 22, 23 and 24 of the straight advance ring 20, and the bosses 34 are respectively engaged with 3 cam grooves 13 of the female helicoid cylinder 10.

The male helicoid cylinder 40 is a cylinder body which is assembled inside of the female helicoid cylinder 10 and assembled on the outside of the guides 22, 23 and 24 of the straight advance ring 20, and in the vicinity of the front side end portion, the lens holding portion 43 to hold the front group lens 45, which will be described later, is formed. In this lens holding portion 43, a through hole 43a through which the leading edge of the guide section 22 of the straight advance ring 20 is made to penetrate, is formed. Further, on the inner peripheral surface of the male helicoid cylinder 40, 3 sets of a rail (showing is omitted) which nips the respective of the guide sections 22, 23 and 24 of the straight advance ring 20 from both sides so that it can be slid in the optical axis direction, and the groove (showing is omitted) which slidably engage the guide section 33 of the rear group lens holding frame 30 in the optical axis direction, are respectively formed. Further, on the rear side end portion of the male helicoid cylinder 40, cutouts 44 through which the bosses 34 of the rear group lens holding frame 30 can penetrate, are formed at 3 portions.

Further, on the rear side end portion of the outer peripheral surface of the male helicoid cylinder 4, the male helicoid 41 as the guided section which is engaged with the female helicoid 14 of the female helicoid cylinder 10 is formed. The male helicoid 41 is, as shown in FIG. 2, formed of a plurality of protruded stripes 42 which protrude from the outer peripheral surface, and on the side surface of the front side or the rear side of the protruded stripe 42, when it is in contact with the female helicoid 14, it is engaged with that.

On the side surface on the front side and the rear side, the first lead surface 42a (the first male helicoid portion) whose angle (lead angle) in the optical axis direction to the peripheral direction is different, and the second lead surface 42b (the second male helicoid portion) are formed, and the male helicoid 41 is formed as the compound male helicoid composed of these first lead surface 42a and the second lead surface 42b.

The first lead surface 42a is formed in such a manner that it forms almost same angle as the lead angle of the first female helicoid portion 14a of the female helicoid cylinder 10 and the third female helicoid portion 14c, and further, the length of the peripheral direction of the surface is formed to be longer than the second lead surface 42b. Further, the second lead surface 42b is formed in such a manner that it forms almost same angle as the lead angle of the second female helicoid portion 14b of the female helicoid cylinder 10.

In the male helicoid 41, when the first lead surface 42a is formed long, the engagement area of the male helicoid 41 with the first female helicoid portion 14a and the third female helicoid portion 14c is increased, and the male helicoid cylinder 40 can more accurately slide to the female helicoid cylinder 10, and the strength at the time of engagement is increased.

Further, the male helicoid 41 is formed in such a manner that at least one set of the adjoining protruded stripes 42 is overlapped being viewed from the optical axis direction. Thereby, when the male helicoid 41 is engaged with the female helicoid 14, on at least one portion of the male helicoid 41, the female helicoid 14 is engaged being nipped by 2 protruded stripes 42, and the male helicoid cylinder 40 is adequately assembled to the female helicoid cylinder 10 without play. Further, when a portion of adjoining protruded stripes 42 is respectively overlapped, being viewed from the optical axis direction, the outside light can be prevented from leaking into the inside of the lens barrel 1 from between the male helicoid cylinder 41 and the female helicoid cylinder 10. In the present embodiment, over almost all periphery of the male helicoid cylinder 40, the adjoining mutual compound male helicoids are formed in such a manner that a portion of them is overlapped, being viewed from the optical axis direction. In the male helicoid 41, the more such overlapped portions, it is the more preferable.

A state of the engagement of the male helicoid 41 with the female helicoid 14 is shown in FIGS. 4(a) to 4(d). In FIGS. 4(a) to 4(d), a portion of the female helicoid 14 in the inner peripheral surface side in which the female helicoid cylinder 10 is developed, and a portion of the male helicoid 41 which is engaged with that, are generally shown.

Figure 4:
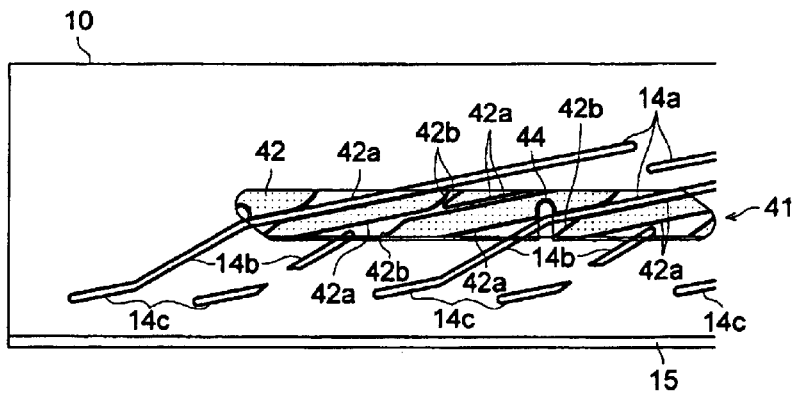
FIGS. 4(a) to 4(d) show a portion of the female helicoid on the inner peripheral surface side at which the female helicoid cylinder is developed and a portion of the male helicoid which is engaged with the female helicoid.
Figure 4:
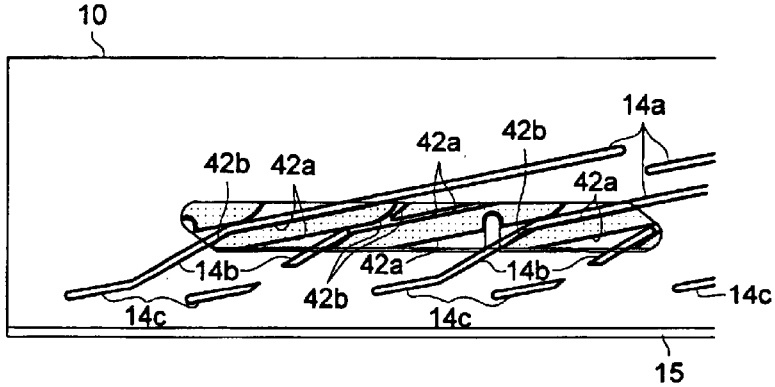
Figure 4:
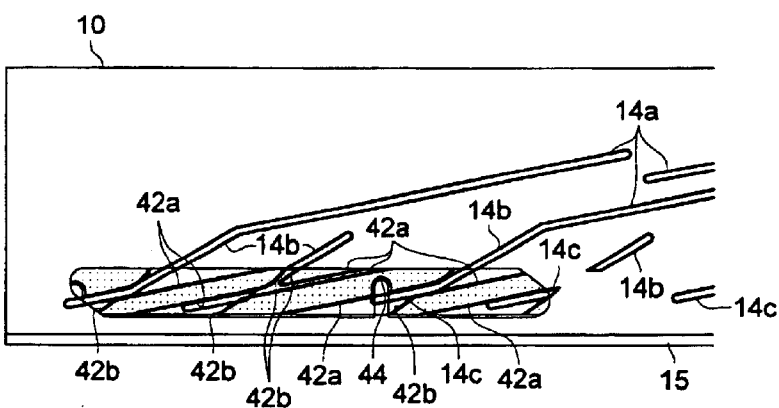
Figure 4:
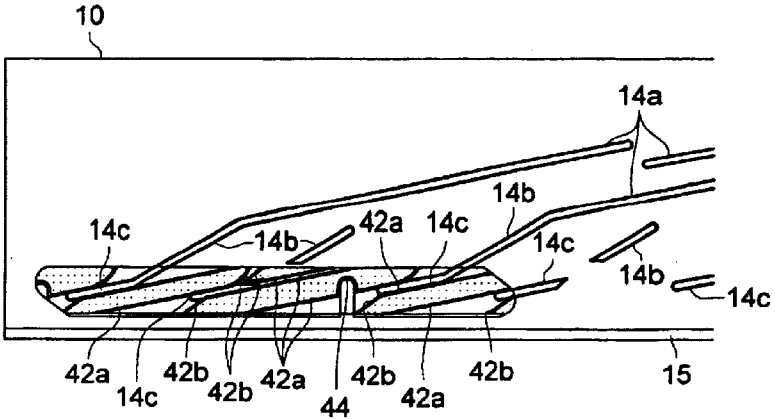

When the male helicoid cylinder 40 is assembled to the female helicoid cylinder 10, and the lens barrel 1 comes in the using state, and the male helicoid cylinder 40 is positioned in the operating position to the female helicoid cylinder 10, as shown in FIG. 4(a), when the first lead surface 42a of the male helicoid 41 is in contact with the first female helicoid portion 14a, the male helicoid 41 is engaged with the female helicoid 14.

Further, in a process in which the lens barrel is retracted from the operating position to the storing position direction, when the second lead surface 42b of the male helicoid 41 is in contact with the second female helicoid portion 14b, the male helicoid 41 is engaged with the female helicoid 14. Hereupon, FIG. 4(b) is the state in which the contact of the male helicoid 41 is moves from the first female helicoid portion 14a to the second female helicoid portion 14b, and shows the state in which the first lead surface 42a and the second lead surface 42b on the front side of the male helicoid 41 respectively come into contact with the first female helicoid portion 14a and the second female helicoid portion 14b.

Furthermore, when the male helicoid cylinder 40 is in the storing position, the male helicoid 41 is, in the same manner as the fist female helicoid portion 14a, engaged with the third female helicoid portion 14c on the first lead surface 42a (FIG. 4(d)). Hereupon, FIG. 4(c) is the state in which the contact of the male helicoid 41 is moves from the second female helicoid portion 14b to the third female helicoid portion 14c, and shows the state in which the first lead surface 42a and the second lead surface 42b on the rear side of the male helicoid 41 respectively come into contact with the third female helicoid portion 14c and the second female helicoid portion 14b.

Figure 5:
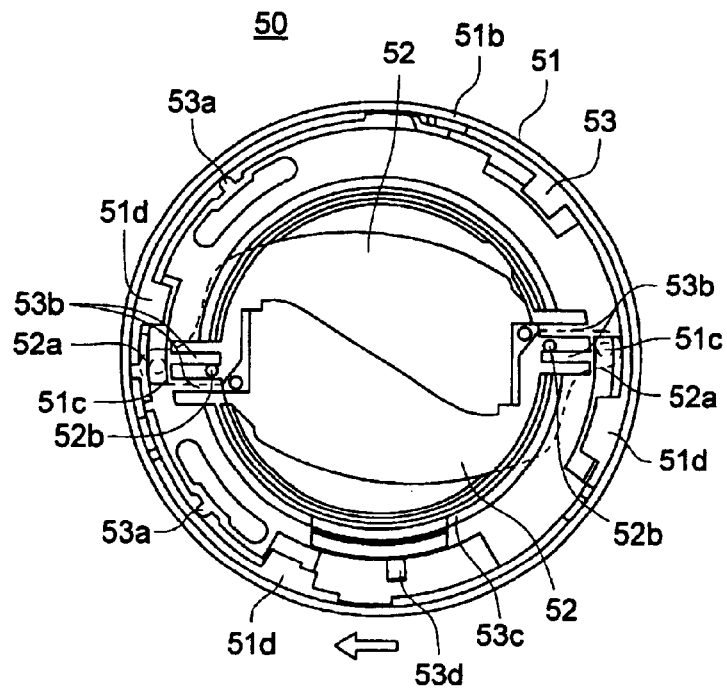
FIGS. 5(a) and 5(b) are plan views showing a rearward side of the lens barrier portion and FIG. 5(a) shows a condition that a lens window is closed.
Figure 5:
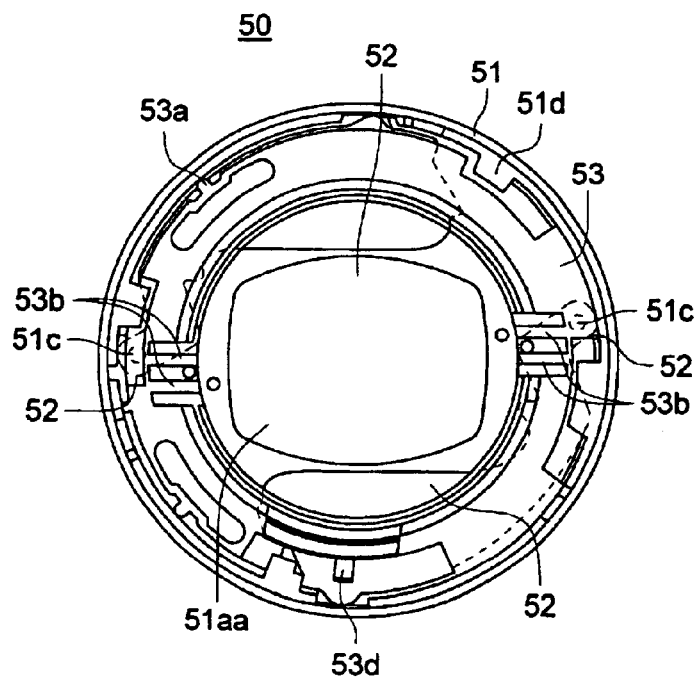

The lens barrier section 50 is structured being provided with a front frame 51, and 2 barriers 52 and 52, and a rotation ring 53. The rear side of the lens barrier portion 51 is shown in FIG. 5. The front frame 51 is formed being provided with the front frame 51a formed almost perpendicularly to the optical axis of the lens barrel 1, and along the outer periphery of the front frame 51a, the outer peripheral frame 51b extending rearward almost in parallel to the optical axis.

A lens window 51aa is formed inside the front frame 51a, and further, on the rear side of the front frame 51a, bosses 51c, 51c protruding rearward are provided at 2 portions of the position which is the symmetry around the optical axis of the lens barrel 1. Further, on the inner peripheral surface of the outer peripheral frame 51b, claw portions 51d protruding inside are formed at 4 portions.

Two barriers 52 are feather-shape, are formed in such a manner that each barrier 52 covers the lens window 51aa of the front frame 51 by about half by half. In one end portion of the barrier 52, an attachment hole 52a which is engaged with the boss 51c of the front frame 51a is formed, and each of the barrier 52 is attached rotatably around the boss 51c to the front frame 5a. Further, on each of the barrier 52, a convex portion 52b protruded rearward is formed at the position inside or outside from the attachment hole 52a.

A rotation ring 53 is a ring-like member formed of flexible resin, and inside the front frame 51, it is sandwiched between the barrier 52 and a claw portion 51d of the outer peripheral frame 51b, and rotatably provided. On the outer peripheral portion of the rotation ring 53, protrusions 53a protruded in the direction of the outer peripheral frame 51b are formed at a plurality of portions. By these protrusions 53a, the rotation ring 53 is lightly engaged with the outer peripheral frame 51b, and only when the external force is applied, it is rotated in the peripheral direction.

Further, at two portions of the inner peripheral portion of the rotation ring 53, sandwiching portion 53b for respectively sandwiching the convex portion 52b of two barriers 52 are formed at two portions. The sandwiching portion 53b is integrally molded in such a manner that a portion of the rotation ring 53 is respectively extended long and narrow for two strings in the inside direction.

When the rotation ring 53 is rotated under the condition that the sandwiching portion 53b respectively sandwiches the convex portions 52b of two barriers 52, two barriers 52 are respectively rotated around the attachment hole 52a, and open or close the lens window 51aa.

Further, in the rotation ring 53, an inner frame 53c extending rearward almost in parallel to the optical axis along the inner periphery is formed. At a predetermined portion of the inner frame 53c, a rotation boss 52d protruded outside is formed. This rotation boss 52d is engaged with a cam groove 25 formed on the leading edge of the guide 22 of the straight advance ring 20 (FIG. 6(a)). When the straight advance ring 20 is moved in the optical axis direction (for example, arrowed B direction of FIG. 6(a)) under the condition that the rotation boss 52d is engaged with the cam groove 25, the rotation boss 52d is moves along the cam groove 25. As the result, the strength of the peripheral direction (for example, arrowed C direction of FIG. 6(b)) is applied to the rotation ring 53, and the rotation ring 53 is rotated, and the barrier 52 is rotated corresponding to that, and the lens window 51aa is opened or closed.

Figure 6:
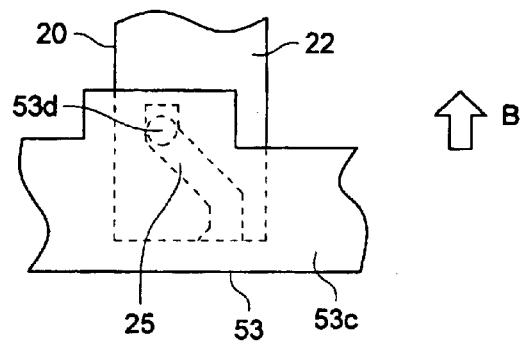
FIGS. 6(a) to 6(c) are side views showing the condition that, in the lens barrier open and close mechanism, a rotation ring is rotated at a guide leading edge portion of a straight advance ring.
Figure 6:
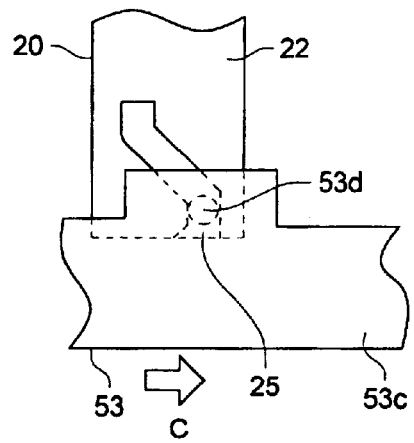
Figure 6:
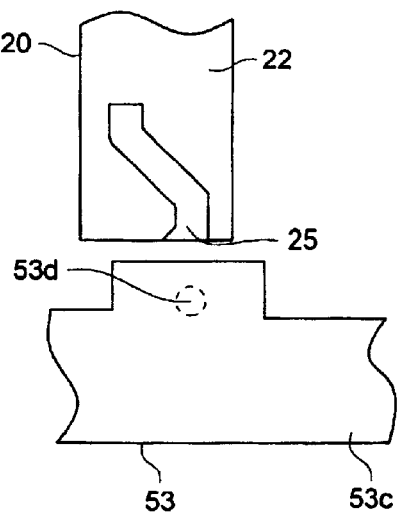

Hereupon, when the lens barrel 1 is in the storing condition in the photographing apparatus 100, as shown in FIG. 6(a), the rotation boss 52d is engaged in the vicinity of end portion of the most depths side of the cam groove 25, and under this condition, the barrier 52 perfectly closes the lens window 51aa. Further, while the lens barrel 1 moves from the storing state to the using state, as shown in FIG. 6(b), the rotation boss 52d moves along the cam groove 25, and as shown in FIG. 6(c), when these engagements are disengaged, the barrier 52 perfectly opens the lens window 51aa.

In the lens barrier portion 50 structured in this manner, because the pin 53 is a flexible resin and integrally molded with the rotation ring 53, under the condition that the barrier 52 perfectly opens the lens window 51aa, or perfectly closes it, the over stroke (a rotation over portion) of the rotation ring 53 is absorbed by the sandwiching portion 53b.

Further, when the rotation ring 53 is lightly engaged with the front frame 51 by the protrusion 53a, the frictional resistance is generated, and the rotation of the rotation ring 53 under the condition that no external force is applied, is blocked. Accordingly, when the lens barrel 1 is in the condition that the photographing can be conducted, that is, while the engagement of the rotation boss 52d with the cam groove 25 is disengaged, the rotation ring 53 holds the barrier 52 in the opened condition.

Further, in the lens barrel 1, under the condition that the straight advance ring 20 is assembled in the female helicoid cylinder 10, the ring member 6 having almost the same outer diameter as the outer diameter of the female helicoid cylinder 10 is attached to the rear end portion of the straight advance ring 20. By the ring member 6, the protruded stripe 15 of the female helicoid cylinder 10 is sandwiched between the ring portion 21 of the straight advance ring 20 and the ring member 6. As the result, the straight advance ring 20 is rotatably provided under the condition that the movement in the optical axis direction is blocked, to the female helicoid cylinder 10.

Further, on the outer peripheral portion of this ring member 6, the protrusion 6a is provided, and this protrusion 6a is engaged with the straight advance groove 5b of the inner periphery of the fixed cylinder 5. Thereby, the straight advance ring 20 straight-advances in the optical axis direction without rotation to the fixed cylinder 5. Further, in the ring member 6, at the position corresponding to the long hole 5c of the fixed cylinder 5, a cutout 6b is formed. When the gear of the drive means 60, which will be described later, is engaged with the gear 11a of the female helicoid cylinder 10 through the long hole 5c, by the space formed by this cutout 6b, the ring member 6 does not hinder the engagement.

The drive means 60 shown in FIG. 1 or FIG. 8 is structured providing with the rotation drive means of motor, and the gear for transmitting the drive force of the rotation drive means, and in the photographing apparatus 100, is provided in the vicinity of the fixed cylinder 5. The gear of the drive means 60 is engaged with the gear 11a of the female helicoid cylinder 10 through the long hole 5c of the fixed cylinder 5, and can rotate the female helicoid cylinder 10. Further, the drive means 60 is connected to the drive control circuit 65, and by this drive control circuit 65, the drive or stop of the rotation drive means, or the rotation direction of the motor is controlled.

A control means 70 is, as shown in FIG. 8, structured providing with the CPU (Central Processing Unit) 71, ROM (Read Only Memory) 72, and RAM (Random Access Memory) 73. The control means 70 outputs the drive signal for driving the drive means 60 to the drive control circuit 65.

Further, in the photographing apparatus 100, an operation section 75 structured by input buttons is provided. When the user operates this operation section 75, a indication signal for coming into the storing state or using state, or operation signal for conducting the focusing and magnification change is outputted to the control means 70.

When the indication signal or operation signal from the operation section is inputted into the control means 70, the CPU 71 corresponds to the signal, and for making the lens barrel 1 go in the storing state or using state, or conduct the focusing and magnification change, calculates the adequate position of the front group lens 45 and the rear group lens 32. Then, the drive signal is outputted to the drive control circuit 65 and the lens barrel 1 is driven through the drive means 60, so that each lens group is moved to the adequate position according to the calculation result. In this control means 70, the stop control of the lens group may also be conducted by using the pulse (LDP1 or LDP2) generated corresponding to the movement amount of the lens group as described in Japanese Tokkaihei- No. 06-313834. Hereupon, in the photographing apparatus 100, an automatic focus (AF) sensor may also be provided, and when photographing, when the AF sensor measures the distance to the subject, and the distance information is inputted into the control means 70, the control means 70 may also output the lens drive signal for the focusing and magnification change to the drive control circuit 65. Further, the control means 70 may also be structured so that, the drive signal by which the lens group is advanced or retreated is outputted to the drive means 65, corresponding to the input button pressing operation of the operation section of the user.

Next, an assembling method of the lens barrel 1 will be described. Initially, the rear group lens holding frame 30 is assembled to the rail of the inner periphery of the male helicoid cylinder 40, next, the guides 22, 23, 24 of the straight advance ring 20 are assembled to the rail of the inner periphery of the male helicoid cylinder 40. In this case, on one hand, the leading edge portion of the guide 22 makes it possible that the through hole 43a is inserted, and the guide section 33 of the rear group lens holding frame 30 is engaged with the groove of the male helicoid cylinder 40, and it is positioned so that the bosses 34 can protrude from the cutout 44.

Then, the male helicoid cylinder 40 is assembled inside the female helicoid cylinder 10 in such a manner that the male helicoid 41 is engaged with the female helicoid 14, and the boss 34 of the rear group lens holding frame 30 is engaged with the cam groove 13. After that, in the rear end portion of the female helicoid cylinder 10, the ring member 6 is fixed to the ring portion 21 of the straight advance ring 20, and further, the male helicoid 41 is assembled inside the fixed cylinder 5 in such a manner that the protrusion 6a of the ring member 6 is engaged with the straight advance groove 5b of the fixed cylinder 5. In this case, on the front side end portion of the male helicoid cylinder 40, the front group lens 45 is held, and the lens barrier portion 50 is made in such a manner that the rotation boss 53d can be engaged with the cam groove 25 of the leading edge portion of the guide 22, and the front frame 51 is fixed on the front side end portion of the male helicoid cylinder 40.

The lens barrel 1 structured in this manner is attached after the fixed cylinder 5 is fixed, in the photographing apparatus 100, in such a manner that the gear 11a of the female helicoid cylinder 10 is engaged with the gear of the drive means through the long hole 5c of the fixed cylinder 5. Then, when the drive means 60 is driven, the drive force is transmitted to the gear 11a, and the female helicoid cylinder 10 is rotated, and the female helicoid cylinder 10 is moved being rotated to the optical axis direction, by the helicoid action of the helicoid groove 11b of the outer periphery and the protruded stripe 5a of the fixed cylinder 5. Then, the straight advance ring 20 straight-advances in the inside of the fixed cylinder 5 together with the female helicoid cylinder 10. The male helicoid cylinder 40 is moved to the photographing apparatus main body 2 accompanied by the movement of the female helicoid cylinder 10, and on the one hand, because the rotation is hindered by the engagement with the guides 22, 23, and 24 of the straight advance ring 20, corresponding to the rotation of the female helicoid cylinder 10, by the helicoid action of the female helicoid 14 with the male helicoid 41, it is moved to the frontward or rearward of the optical axis direction to the female helicoid cylinder 10.

Further, the rear group lens holding frame 30 which is engaged with the male helicoid cylinder 40 at the guide section 33 is moved in the optical axis direction when the boss 34 is moved along the cam groove 13 by the rotation of the female helicoid cylinder 10. When it is moved in this manner, the straight advance ring 20 is integrally moved with the female helicoid cylinder 10 in the optical axis direction, and on the one hand, the male helicoid cylinder 40 is moved to the female helicoid cylinder 10. Therefore, the leading edge portion of the guide 22 protrudes forward from the through hole 43a when the male helicoid cylinder 40 is positioned rearmost to the female helicoid cylinder 10, and when the male helicoid cylinder 40 is moved forward, it is relatively retracted rearward from the through hole 43a.

Next, the protruding and retracting operation of the lens barrel 1 in the photographing apparatus 100, and the focusing and magnification change operation will be described. FIGS. 7(a) to 7(c) are outline sectional views of the storing state of the lens barrel 1 (7(a)), wide position of the using state (7(b)), and telescopic position (7(c)).

In the storing state (7(a)), the helicoid groove 11b of the female helicoid cylinder 10 is engaged with the protruded stripe 5a at the rear side of the fixed cylinder 5, and the boss 34 of the rear group lens holding frame 30 is engaged at the rear side end portion of the cam groove 13 of the male helicoid cylinder 40, and the male helicoid 41 of the male helicoid cylinder 40 is, at the rear side end portion of the female helicoid cylinder 10, engaged with the third female helicoid portion 14c (FIG. 4(d)).

When the control means 70 outputs the drive signal so that the lens barrel 1 is protruded to the using state, the drive means 60 is driven, and the female helicoid cylinder 10 is rotated in the fixed cylinder 5. Thereby, the male helicoid 41 of the male helicoid cylinder 40 and the third female helicoid portion 14c are slid each other, and the male helicoid cylinder 40 moves forward following the lead of the third female helicoid portion 14c. Then, the male helicoid 41 comes into contact with the second female helicoid portion 14b soon (FIG. 4(c)).

The female helicoid cylinder 10 is further rotated, the male helicoid 41 moves from the engagement with the third female helicoid 14c to the engagement with the second female helicoid 14b, and the male helicoid cylinder 40 quickly moves forward following the lead of the second female helicoid portion 14b whose lead angle is large. Then, the male helicoid 41 comes into contact with the first female helicoid portion 14a whose lead angle is smaller than the second female helicoid portion 14b (FIG. 4(b)), and when the female helicoid cylinder 10 is further rotated, the engagement is moved to the first female helicoid portion 14a (FIG. 4(a)).

At the predetermined position at which the movement of the engagement of the male helicoid 41 with the female helicoid 14 from the second female helicoid portion 14b to the first female helicoid portion 14a is perfectly completed, the front group lens 45 and the rear group lens 32 are positioned at the position of the minimum magnification (wide) at which the photographing can be conducted (FIG. 7(b)).

From this wide position, when the female helicoid cylinder 10 is rotated by further driving the drive means 60, the male helicoid cylinder 40 is gradually protruded by being led by the first female helicoid portion 14a whose lead angle is small, and when the rear group lens holding frame 30 is protruded by being led by the cam groove 13, the front group lens 45 and the rear group lens 32 are moved at a predetermined interval. When the male helicoid cylinder 40 and rear group lens holding frame 30 are moved forward, the front group and rear group lenses arrive at the maximum magnification (telescopic) position (FIG. 7(c)). When the male helicoid cylinder 40 and rear group lens holding frame 30 are moved between from the wide position to the telescopic position, the focusing and the magnification change operation is conducted corresponding to the subject and a desired photographic magnification.

Further, when the control means 70 outputs the drive signal so that the lens barrel 1 is stored from the using state, the drive means 60 rotates the female helicoid cylinder 10 in the opposite direction to the case where the lens barrel 1 is protruded. Then, the rear group lens holding frame 30 is retracted rearward along the cam groove 13, and the male helicoid cylinder 40 is retracted according to the lead of the first female helicoid portion 14a, and it is engaged with the second female helicoid portion 14b soon. Then the male helicoid cylinder 40 is led by the second female helicoid portion 14b, and quickly retracted, and at the rearward, it is further engaged with the third female helicoid portion 14c and retracted, and the lens barrel 1 is arrives at the storing state soon.

In the control means 70, a predetermined position of the optimum male helicoid cylinder 40 is set as the predetermined optimum storing position at the time of completion of the retraction. Then, the control section 70 controls so that the retraction of the male helicoid cylinder 40 is stopped at the predetermined optimum storing position, at the time of retraction of the male helicoid cylinder 40. However, due to the drive stop error of the drive means 60 or the rotation stop error of the female helicoid cylinder 10, there is a case where a dislocation is generated between this predetermined optimum storing position and the actual storing position at which the male helicoid cylinder 40 is actually stopped. However, in the storing state of the lens barrel 1, because the male helicoid 41 of the male helicoid cylinder 40 is engaged with the third female helicoid portion 14c whose lead angle is smaller than the second female helicoid portion 14b, at the time of completion of the retraction, even when the error is generated at the stop position in the peripheral direction of the male helicoid cylinder 40 to the female helicoid cylinder 10, the dislocation in the optical axis direction is decreased, and in the optical axis direction, within a predetermined narrow range, the retraction of the male helicoid cylinder 40 can be stopped.

Further, the open and close operation of the lens window 51aa of the lens barrier portion 50 which is operated being interlocked with such the protrusion, or the protruding and retracting operation, will be described below. When the lens barrel 1 is in the storing state (FIG. 7(a)), the guide groove 25 of the leading edge portion of the guide 22 of the straight advance ring 20 and the rotation boss 52d of the rotation ring 53 of the lens barrier portion 50 is engaged with each other at the depth position of the guide groove 25 as shown in FIG. 6(a). When the lens barrel 1 is protruded forward from the storing state, the lens barrier portion 50 is moved forward together with the male helicoid cylinder 40 to the female helicoid cylinder 10, thereby, the rotation boss 53d moves forward in the cam groove 25 as shown in FIG. 6(b). Corresponding to this, the rotation ring 53 is rotated to the front frame 51 of the lens barrier portion 50, and the barrier 52 is rotated and the lens window 51aa is opened. In this operation, this system is structured such that, while the lens barrel 1 arrives at the wide position at which the photographing can be conducted, the opening of the lens window 51aa is completed.

Further, when the lens barrel 1 is retracted from the wide position to the storing state, in the retracting operation, the rotation boss 52d of the lens barrier portion 50, and the cam groove 25 of the guide 22 of the straight advance ring 20 are engaged with together, and when the rotation boss 53d is moved to the depth side (rear side), the rotation ring 53 is rotated in the opposite direction to the time of the lens window 51aa opening in the front frame 51, and the barrier 52 closes the lens window 51aa. At the time of completion of retraction of the lens barrel 1, the rotation boss 53d arrives at the rear side end portion of the cam groove 25, and the closing operation of the lens window 51aa is completed.

Hereupon, in the barrier closing operation, when the rotation boss 53d is engaged with the cam groove 25, because the width of the opening portion of the cam groove 25 is formed broad, even when the error is generated at the position of the rotation boss 53d, it can surely be engaged with the cam groove 25. Further, in the closing operation of the lens window 51aa, when the male helicoid cylinder 40 arrives at the predetermined optimum storing position, the rotation boss 53d is set so that it arrives at the rear side end portion of the cam groove 25. As described above, because the dislocation between the actual storing position and the predetermined optimum storing position of the male helicoid cylinder 40 is small, it is prevented that the disadvantage in which, when the lens barrel 1 goes to the storing state, the closing of the lens window 51aa is not enough, is generated, and the lens barrier portion 50 more accurately and preferably operates.

In this photographing apparatus 100, a shutter mechanism, not shown, is provided, and when the user operates the shutter button, the light from the subject is incident on the apparatus through the lens barrel 1, and is exposed on the film, not shown, provided in the photographing apparatus 100.

According to the above photographing apparatus 100, the female helicoid 14 of the female helicoid cylinder 10 is formed as the compound female helicoid composed of the first female helicoid portion 14a for the focusing and magnification change, and the second female helicoid portion 14b for storing, and the third female helicoid portion 14c, and the lead angle of the second female helicoid portion 14b is formed larger than the first and third female helicoid portions 14a, and 14c. Further, the male helicoid 41 of the male helicoid cylinder 40 is formed as the compound male helicoid composed of the first lead surface 42a which is engaged with the first and third female helicoids 14a and 14c, and the second lead surface 42b which is engaged with the second female helicoid portion 14b.

Then, in the protruding and retracting operation from the storing state to the using state of the lens barrel 1, the male helicoid cylinder 40 is quickly moved by the lead of the second female helicoid portion 14b, or moves the sufficient distance for the protrusion and retraction in the optical axis direction, and in the storing state, when the male helicoid 41 is engaged with the third female helicoid portion 14c, at the time of completion of the retraction, even when the error is generated in the stop position in the peripheral direction of the male helicoid cylinder 40 to the female helicoid cylinder 10, the dislocation of the stop position in the optical axis direction is small. Accordingly, because the male helicoid cylinder 40 can be moved by a sufficient distance at the time of the protrusion and retraction, the reduction of the thickness of the photographing apparatus 100 can be intended, and because the dislocation of the position of the front side end portion of the male helicoid cylinder in the storing state to the female helicoid cylinder is reduced, the appearance in the storing state of the lens barrel 1 becomes good.

Further, because the dislocation of the actual storing position of the male helicoid cylinder 40 to the female helicoid cylinder 10, to the predetermined optimum storing position is reduced, the movement of the lens open and close mechanism composed of the leading edge portion of the guide 22 of the straight ring 20 which moves in the optical axis direction together with the female helicoid cylinder 10, and the rotation ring 53 of the lens barrier portion 50, is more accurate. Accordingly, it can be prevented that the opening and closing of the barrier 52 becomes insufficient, and because it is enough that the absorption mechanism of the over stroke (over operation portion) is necessary at the minimum, it is preferable.

Because the first lead surface 42a of the male helicoid 41 is formed longer than the second lead surface 42b, the contact surface of the first lead surface 42a with the first female helicoid portion 14a and the third female helicoid portion 14c is increased. Accordingly, at the focusing and magnification change operation time, and in the storing state, because the male helicoid cylinder 40 and the female helicoid cylinder 10 are adequately engaged with each other without play, the more accurate focusing and magnification change operation can be conducted, and because the strength of the lens barrel 1 in the storing state is increased, it is preferable. Further, because it can be prevented that the external light leaks into the lens barrel 1 from between the male helicoid cylinder and the female helicoid cylinder, it is preferable.

In addition, in the protruded stripes 42 (the compound male helicoid) constituting the male helicoid 41 provided in the male helicoid cylinder 40, at least one portion of adjoining protruded stripes 42 is provided in such a manner that at least one portion of them are overlapped with each other, when viewed from the optical axis direction. Accordingly, when it is engaged with the female helicoid 14, because the female helicoid 14 is nipped between two protruded stripes 42 of the male helicoid 41, the male helicoid cylinder 40 can be adequately engaged with the female helicoid cylinder 10 without play. Further, because it can be prevented that the external light leaks into the lens barrel 1 from between the male helicoid cylinder and the female helicoid cylinder, it is preferable.

Further, according to the photographing apparatus 100 of the present invention, the lens barrier portion 50 is structured by the front frame 51, barrier 52, and the rotation ring 53 which is attached by the claw portion 51d of the front frame 51, and the rotation ring 53 is tightly engaged with the front frame 51 by the protrusion 53a. Accordingly, the fixing means for fixing the rotation ring 53 to the front frame 51 is not necessary. Further, because the rotation ring 53 is not rotated in the front frame 51 so far as the external force is not applied, the barrier 52 can be held in the opened state or closed state of the lens window 51aa, and the rotation blocking means of the rotation ring 53 by the elastic member such as the leaf spring or coil spring is not necessary.

In addition, because the rotation ring 53 is engaged with the convex portion 52b of the barrier 52 at the flexible nipping portion 53b, the over stroke by the rotation can be absorbed by the nipping portion 53b. Accordingly, to provide the mechanism to absorb the over stroke such as the coil spring is not necessary.

Accordingly, because the lens barrier portion 50 can be adequately structured by smaller number of members, the error at the time of opening and closing operation can be reduced, the assembling process can be reduced, and the cost reduction or the increase of the productivity can be performed, it is preferable.

Hereupon, the present invention is not limited to the above embodiment. For example, the number of the cam grooves or helicoids provided in the female helicoid cylinder, and the number of helicoids and bosses engaged with them can be appropriately changed. Further, it is of course possible that the photographing apparatus and the lens barrel of the present invention are also applied to the photographing apparatus of the single focus, or it may also be applied to the lens barrel by which the lens is moved for any one of the focusing and the magnification change.

Further, it may be good when the lead angle of the third female helicoid portion is smaller than that of the second female helicoid portion, and may not also be the same lead angle as the first female helicoid portion. In that case, in the male helicoid, the third lead surface for being engaged with the third female helicoid portion may be formed as the third male helicoid portion. Hereupon, as the embodiment described above, when the first and third female helicoid portions are formed of the same lead angle, the male helicoid can be engaged with the first and third female helicoid portions at the same portion (the first male helicoid portion), and the shape of the male helicoid can be made simpler, and because contact surface of the female helicoid with the male helicoid can be increased, it is more preferable.

In addition, the cam pin (guided section) is provided in the male helicoid cylinder, and the cam groove (guide section) is formed in the female helicoid cylinder, and the male helicoid cylinder may also be moved by the cam structure to the female helicoid cylinder. Also in this case, the cam groove is structured to have the cam portion for the focusing and magnification change, and the cam portion to introduce to the storing position direction (the first guiding part), and the cam portion (the second guiding part) which is the storing position, and it may be structured so that the lead angle of the second guiding part is smaller than the lead angle of the first guiding part. In this case, the movement portion of the cam groove from the first guiding part to the second guiding part may also be formed so that the lead angle is gradually changed, as the curve is drawn.

Further, the protrusion and retraction from the storing state to the using state of the lens barrel, and the focusing and magnification change operation may also be conducted manually, and the automatic and manual operation may also be combinedly used. In addition, the lens barrel of the present invention may also be applied to the telescopic lens requiring the protrusion and retraction operation, monocular glass, or binocular glasses.

According to Structure (4), when the inner barrel is moved from the operating position to the storing position to the outer barrel, the guided section is introduced according to the guide section of the outer barrel, and moved by necessary distance quickly along the first guiding part, and in the vicinity of the storing position, is engaged with the second guiding part whose lead angle is small, and gradually moved, and arrives at the storing position. Accordingly, because the dislocation between the predetermined optimum storing position and the actual storing position of the inner barrel at the completion time of the retraction is reduced, the appearance in the storing state of the lens barrel when the retraction of the inner barrel is completed, becomes good. Further, for example, in the lens barrel, when the barrier which is operated being interlocked with the protruding and retracting operation is provided, because it can be prevented that the operation error like as the actual storing position of the inner barrel is shifted from the predetermined optimum storing position, and the closing of the barrier is imperfect, is generated, it is preferable.

According to Structure (5), when the lead angle of the third female helicoid portion is set small, at the time of the protruding and retracting operation, the male helicoid cylinder is gradually moved to the female helicoid cylinder, and arrives at the storing position. Accordingly, because the dislocation between the actual storing position of the male helicoid cylinder to the female helicoid cylinder and the predetermined optimum storing position is reduced, the appearance at the storing state of the lens barrel becomes good. Further, for example, when the barrier operated being interlocked with the protruding and retracting operation is provided, because it can also be prevented that the operation error of the barrier is generated by the dislocation between the actual storing position and the predetermined optimum storing position, it is preferable.

According to Structure (6), it is of course that the effect of the invention described in Structure (2) is attained, and the first female helicoid portion is set to the adequate lead angle for the focusing operation, and second and third female helicoid portions are adequately set to the lead angles which is appropriate for the operation except for the focusing operation, that is, the lead angles which is appropriate for the protruding and retracting operation, and can be used. Accordingly, the focusing operation, and the protruding and retracting operation can be preferably carried out.

According to Structure (7), when the lead angle of the second female helicoid portion is set large, the movement distance of the male helicoid cylinder at the time of the protruding and retracting operation can be increased. Accordingly, the apparatus provided with the leans barrel, for example, the reduction of the thickness of the apparatus such as the photographing apparatus, can be intended. Further, at the time of the protruding and retracting operation, the male helicoid cylinder can be moved faster than the third female helicoid portion, and because the switch of the storing state and the using state can be quickly carried out, it is preferable.

According to Structure (8), when the first female helicoid portion and the third female helicoid portion are formed of the almost same lead angle, in the male helicoid, the first male helicoid portion and the second male helicoid portion are formed, and the first male helicoid portion can be engaged with both of the first and the third female helicoid portions. Accordingly, the shape of the male helicoid can be made simple, and because the contact surface when it is engaged with the female helicoid, can be increased, the male helicoid cylinder and the female helicoid cylinder can be preferably engaged with each other without play. Further, when the contact area of the male helicoid with the female helicoid is increased, because it can be prevented that the external light leaks in the lens barrel from between the male helicoid cylinder and the female helicoid cylinder, it is preferable.

According to Structure (9), when the engagement length of the peripheral direction of the first male helicoid portion to the first female helicoid portion is increased, the contact area of the male helicoid cylinder with the female helicoid cylinder can be increased, and they can be adequately engaged without play. Accordingly, when the first male helicoid portion is used for the focusing operation, the focusing operation can be more accurately carried out. Further, when the first and the third female helicoids are formed of the almost same lead angle, the strength of the engagement of the male helicoid cylinder with the female helicoid cylinder in the storing state is increased, and at the time of storing, because the male helicoid cylinder can be more accurately retracted in the predetermined optimum storing position, it is preferable.

According to Structure (10), in the engagement of the female helicoid with the male helicoid, in at least one portion of the peripheral direction, because the female helicoid is nipped between two adjoining compound male helicoids, the male helicoid cylinder can be adequately assembled to the female helicoid cylinder without play. Further, when portions of the adjoining compound male helicoids are overlapped with each other, viewed from the optical axis direction, because it can be prevented that the external light leaks in the lens barrel from between the male helicoid cylinder and the female helicoid cylinder, it is preferable.

According to Structure (11), the male helicoid cylinder is positioned in an area in which, at the storing position, the first male helicoid portion is engaged with the third female helicoid portion which is formed into the smaller lead angle than the lead angle of the second female helicoid portion. Accordingly, also in the photographing apparatus which is provided with the drive means and control means, and automatically moves from the operating position to the storing position of the male helicoid cylinder, the dislocation between the actual storing position of the male helicoid cylinder to the female helicoid cylinder and the predetermined optimum storing position is reduced. As the result, the appearance in the storing state of the lens barrel becomes good. Further, for example, even when the barrier which is operated being interlocked with the protruding and retracting operation of the lens barrel, is provided, because it can be prevented that the operation error of the barrier is generated, it is preferable.

What is claimed is:

1. A lens barrel comprising:
   (a) an outer cylinder having a guide section formed on an inner peripheral surface thereof; and
   (b) an inner cylinder for holding a lens and having a guided section formed on an outer peripheral surface thereof, which is engaged with the guide section, the inner cylinder being moved in an optical axis direction in response to a rotation of the outer cylinder,
   wherein the guide section has a guiding portion for introducing the inner cylinder into a plurality of positions including an operating position and a storing position, and the guiding portion has a first guiding part, a second guiding part formed continuously to the first guiding part, having a lead angle different from that of the first guiding part, and a third guiding part formed continuously to the second guiding part, having a lead angle smaller than that of the second guiding part, and almost the same lead angle as the first guiding part, and
   wherein the inner cylinder is positioned, at the storing position, within an area in which the guided section is engaged with the third guiding part.

2. The lens barrel of claim 1, wherein each of the first, second and third guiding parts is formed by a female helicoid, and the guided section has a first male helicoid part engaged with the first guiding part, a second male helicoid part engaged with the second guiding part and a third male helicoid engaged with the third guiding part.

3. The lens barrel of claim 1, wherein the first guiding part moves the inner cylinder in the optical axis for focusing operation.

4. The lens barrel of claim 2, wherein an engaging length in a peripheral direction of the first male helicoid with respect to the first guiding part is longer than an engaging length in a peripheral direction of the second male helicoid with respect to the second guiding part.

5. A lens barrel comprising:
   (a) a female helicoid cylinder having a female helicoid formed on an inner peripheral surface thereof; and
   (b) a male helicoid cylinder for holding a lens, having a male helicoid formed on an outer peripheral surface, which is engaged with the female helicoid, the male helicoid cylinder being moved in an optical axis direction in response to a rotation of the female helicoid cylinder,
   wherein the female helicoid is made as a compound female helicoid, including a first female helicoid portion, a second female helicoid portion formed continuously to the first female helicoid portion and having a lead angle different from that of the first female helicoid portion, and a third female helicoid portion formed continuously to the second female helicoid portion and having a lead angle smaller than that of the second female helicoid portion,
   wherein the male helicoid in the male helicoid cylinder is made as a compound male helicoid including a first male helicoid portion engaged with the first female helicoid portion, a second male helicoid portion engaged with the second female helicoid portion, and a third male helicoid portion engaged with the third female helicoid portion, and
   wherein the third female helicoid portion moves the male helicoid cylinder in the optical axis direction for protruding or retracting operation.

6. The lens barrel of claim 5, wherein the first female helicoid part moves the male helicoid cylinder in the optical axis direction for focusing operation.

7. The lens barrel of claim 5, wherein the second female helicoid part moves the male helicoid cylinder in the optical axis direction for protruding and retracting operation which is faster than the third female helicoid part.

8. The lens barrel of claim 5, wherein the first female helicoid part and the third female helicoid part are formed with almost the same lead angle.

9. The lens barrel of claim 5, wherein an engagement length in a peripheral direction of the first male helicoid part with respect to the first female helicoid part is longer than an engagement length in a peripheral direction of the second male helicoid part with respect to the second female helicoid part.

10. The lens barrel described of claim 5, wherein adjoining compound male helicoids of at least one part of a compound male helicoid provided on an outer periphery of the male helicoid cylinder are provided such that at least one part viewed from the optical axis direction is mutually overlapped.

11. A lens barrel comprising:
    (a) an outer cylinder having a guide section formed on an inner peripheral surface thereof; and
    (b) an inner cylinder for holding a lens, having a guided section formed on an outer peripheral surface thereof, which is engaged with the guide section, the inner cylinder being capable of being moved between a storing position and an operating position in an optical axis direction in response to a rotation of the outer cylinder,
    wherein the guide section has a guiding portion for introducing the inner cylinder from the operating position to the storing position, and the guiding portion has a first guiding part positioned on a side of the operating position and a second guiding part formed continuously to the first guiding part, a lead angle of the second guiding part is formed to be larger than 0°, and smaller than a lead angle of the first guiding part, and wherein the inner cylinder is positioned, at the storing position, within an area in which the guided section is engaged with the second guiding part.

12. The lens barrel of claim 11, wherein each of the first guiding part and the second guiding part is formed by a female helicoid, and the guided section is formed by a male helicoid.

13. A photographing apparatus comprising:
 (a) a lens barrel comprising,
  (1) an outer cylinder having a guide section formed on an inner peripheral surface thereof, and
  (2) an inner cylinder for holding a lens and having a guided section formed on an outer peripheral surface thereof, which is engaged with the guide section, the inner cylinder being moved in an optical axis direction in response to a rotation of the outer cylinder,
  wherein the guide section has a guiding portion for introducing the inner cylinder into a plurality of positions including an operating position and a storing position, and the guiding portion has a first guiding part, a second guiding part formed continuously to the first guiding part, having a lead angle different from that of the first guiding part, and a third guiding part formed continuously to the second guiding part and having a lead angle smaller than that of the second guiding part, and almost the same lead angle as the first guiding part, and
  wherein the inner cylinder is positioned, at the storing position, within an area in which the guided section is engaged with the third guiding part;
 (b) a driver for driving the outer cylinder; and
 (c) a controller for controlling the driver to move the inner cylinder from the storing position to the operating position.

14. The photographing apparatus of claim 13, wherein each of the first, second and third guiding parts is formed by a female helicoid, and the guided section is formed by a male helicoid.

15. A photographing apparatus comprising:
 (a) a lens barrel comprising;
  (1) a female helicoid cylinder having a female helicoid formed on an inner peripheral surface thereof, and
  (2) a male helicoid cylinder for holding a lens and having a male helicoid formed on an outer peripheral surface, which is engaged with the female helicoid, the male hericoid cylinder being moved in an optical axis direction in response to a rotation of the female helicoid cylinder;
 (b) a driver for driving the female helicoid cylinder; and
 (c) a controller for controlling the driver to move the male helicoid cylinder from the storing position to the operating position,
  wherein the female helicoid is made as a compound female helicoid, including a first female helicoid portion, a second female helicoid portion formed continuously to the first female helicoid portion and having a lead angle different from that of the first female helicoid portion, and a third female helicoid portion formed continuously to the second female helicoid portion, and having a lead angle smaller than that of the second female helicoid portion, and
  wherein the male helicoid in the male helicoid cylinder is made as a compound male helicoid having a first male helicoid portion engaged with the first female helicoid portion and the third female helicoid portion, and a second male helicoid portion engaged with the second female helicoid portion; and
 wherein the first male helicoid portion is positioned, at the storing position, within an area in which the first male helicoid portion is engaged with the third female helicoid portion.

16. The photographing apparatus of claim 15, wherein the first female helicoid portion and the third female helicoid portion have almost the same lead angle.

\* \* \* \* \*